Patented Apr. 27, 1926.

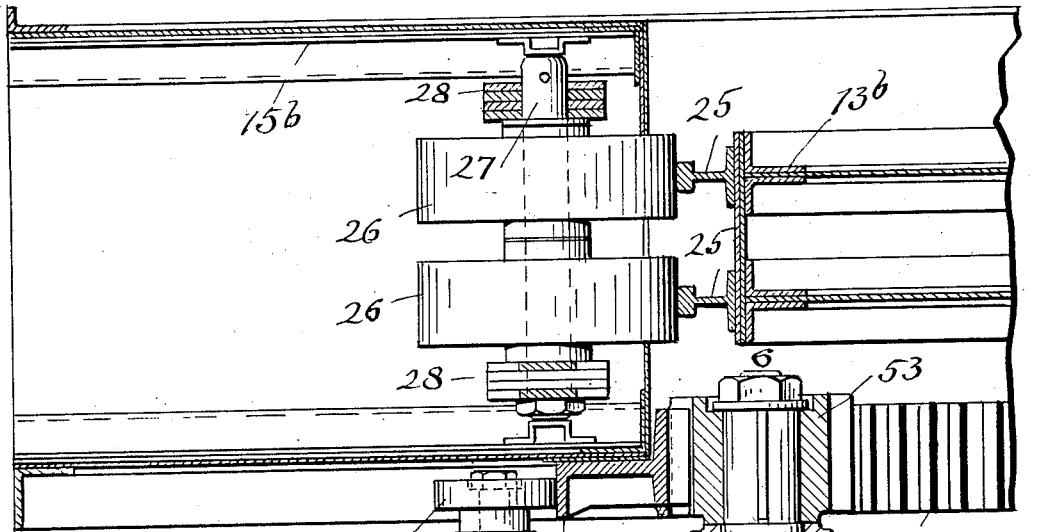
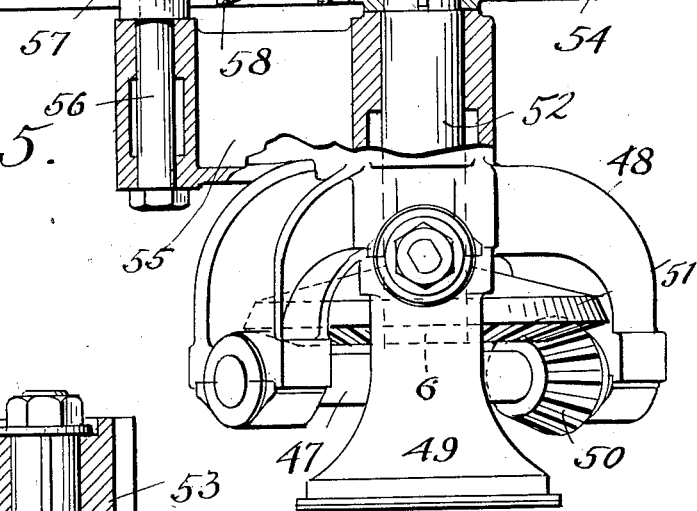
Fig.5.
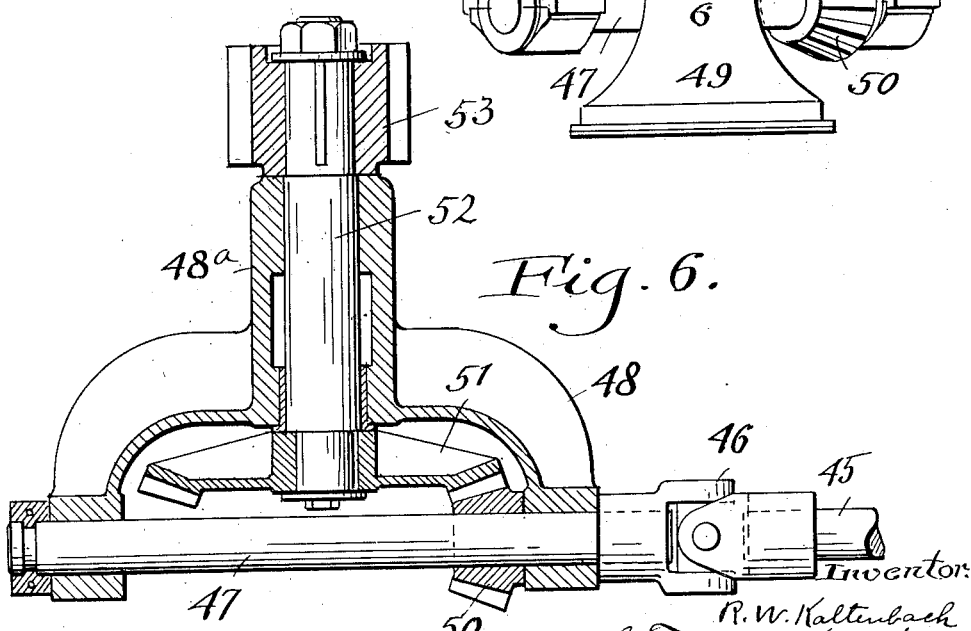
Fig.6.
Inventor:
R. W. Kaltenbach
by Thurston Kwis & Hudson
Attys.

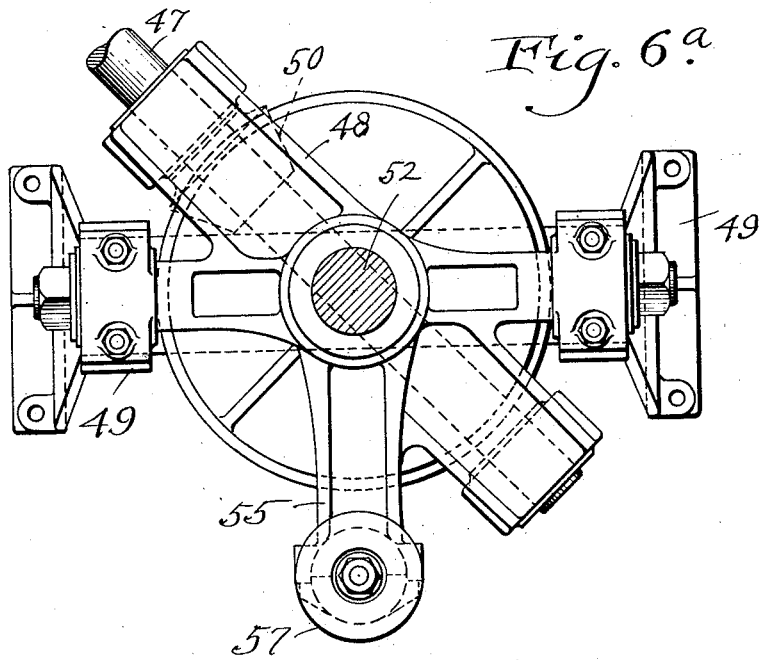
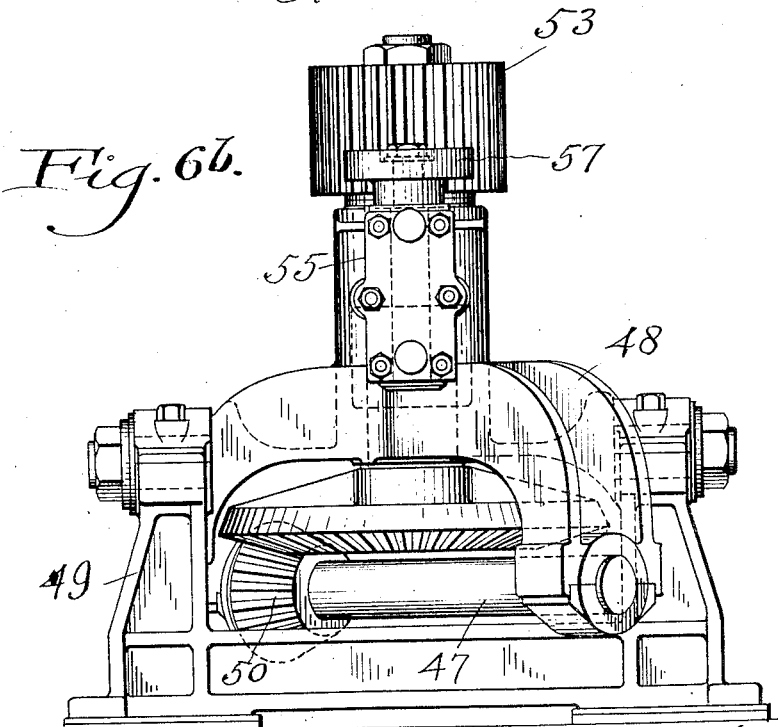

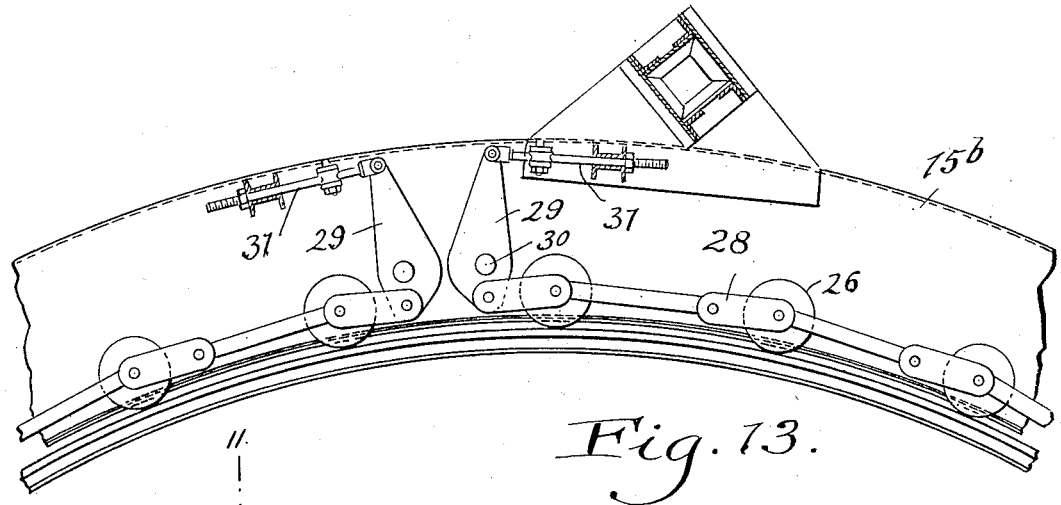
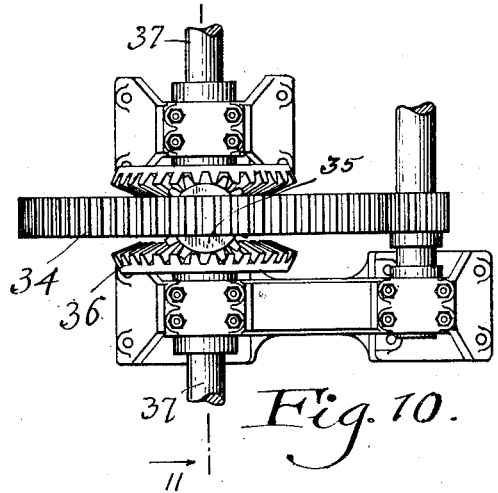
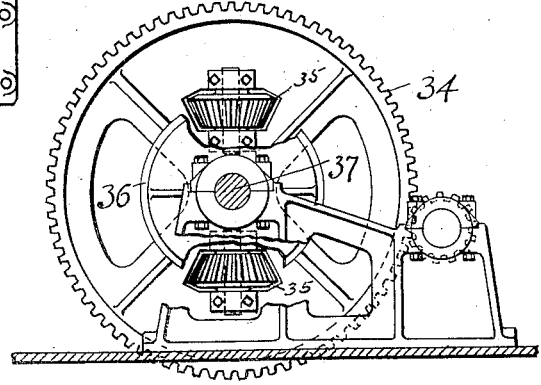
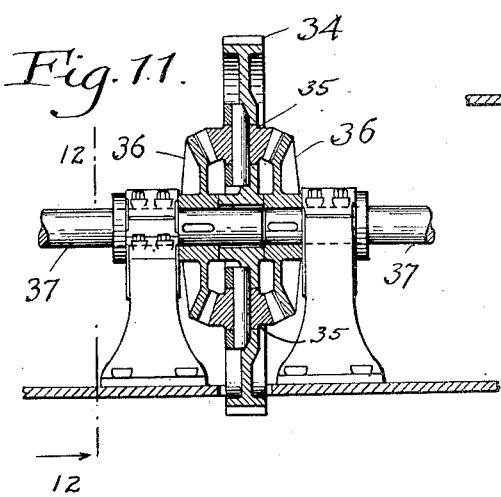

1,582,274

UNITED STATES PATENT OFFICE.

ROBERT W. KALTENBACH, OF CLEVELAND HEIGHTS, OHIO, ASSIGNOR TO THE McMYLER INTERSTATE COMPANY, OF BEDFORD, OHIO, A CORPORATION OF OHIO.

CRANE.

Application filed October 6, 1921. Serial No. 505,730.

*To all whom it may concern:*

Be it known that I, ROBERT W. KALTENBACH, a citizen of the United States, residing at Cleveland Heights, in the county of Cuyahoga and State of Ohio, have invented a certain new and useful Improvement in Cranes, of which the following is a full, clear, and exact description.

This invention relates to cranes, and particularly exceptionally large cranes such as ship-building cranes utilized for the purpose of handling heavy loads at a large radius.

The crane constituting the subject matter of the present invention includes a load supporting arm attached to a long depending skirt which surrounds a stationary tower on which the movable part is journaled for rotary movement on a vertical or substantially vertical axis, and for a slight tipping movement as the load is applied to or removed from the arm, the unbalanced load created by the weight of the arm or by the work carried by it being resisted by the lower part of the stationary tower, and transmitted thereto through the depending skirt.

The invention relates to the general construction of a crane having the above characteristics, and resides also in the thrust resisting devices provided between the lower portions of the skirt and tower; also to means for rotating the rotary structure by applying power to the skirt notwithstanding the rocking movement to which the rotary structure is susceptible, and also to certain details of the bearing for the rotary structure on the upper part of the tower, and to means which I have provided by which the entire rotary structure may be lifted off its bearings for the purpose of inspecting, repairing or replacing bearings.

The invention may further be briefly summarized as consisting in certain novel details of construction, and combinations and arrangements of parts which will be described in the specification and set forth in the appended claims.

Figure 1:
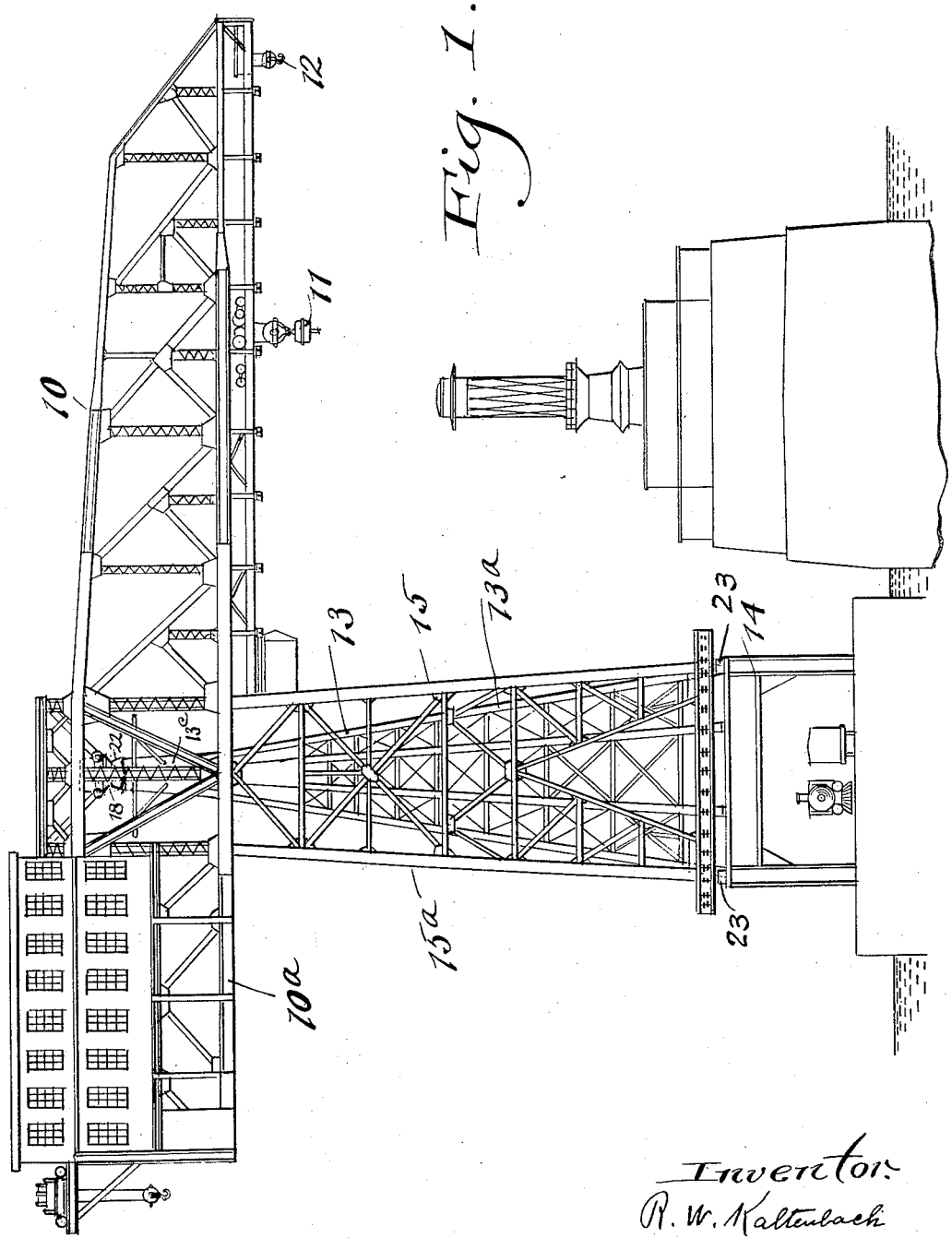
Figure 2:
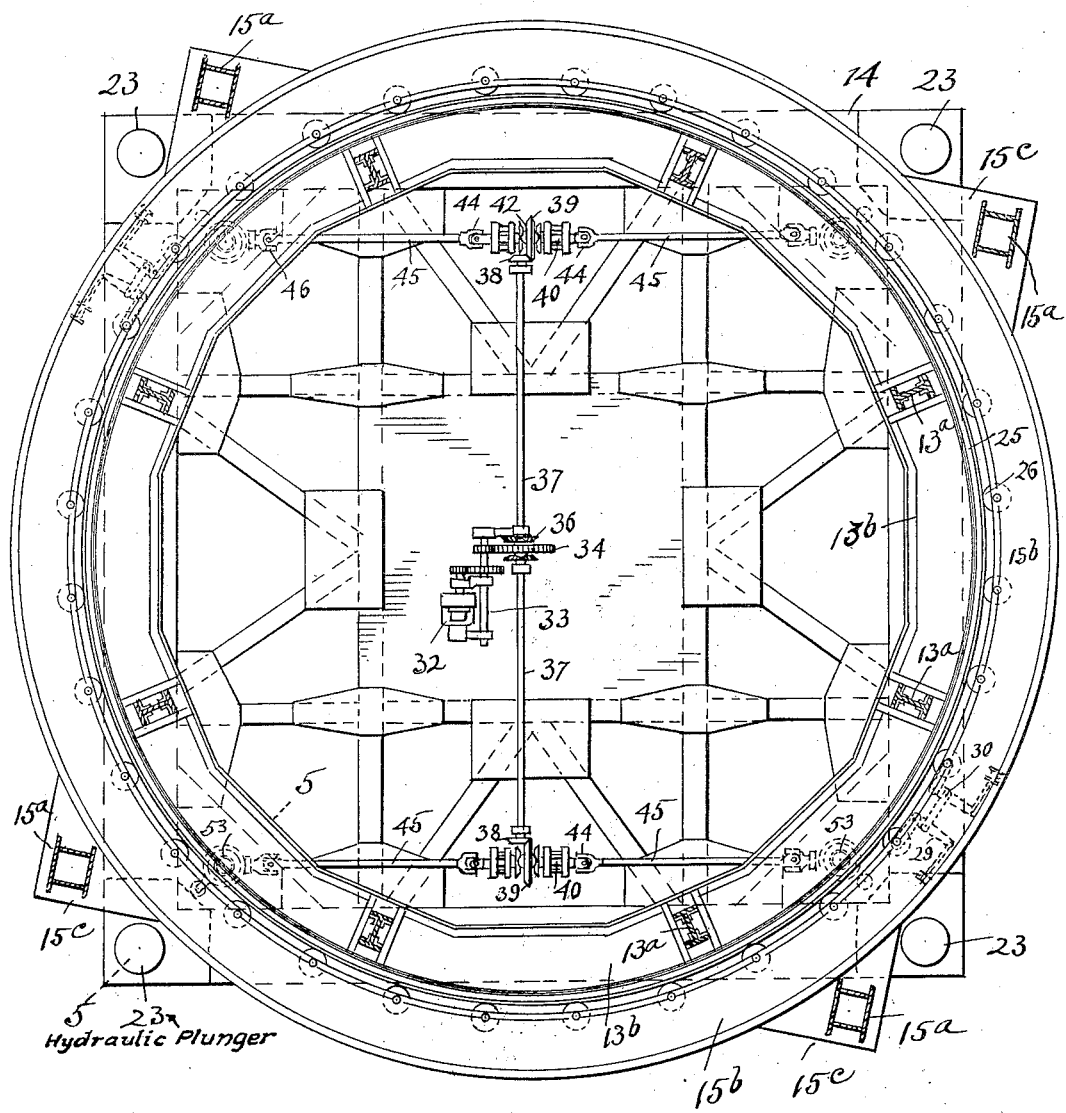
Figure 3:
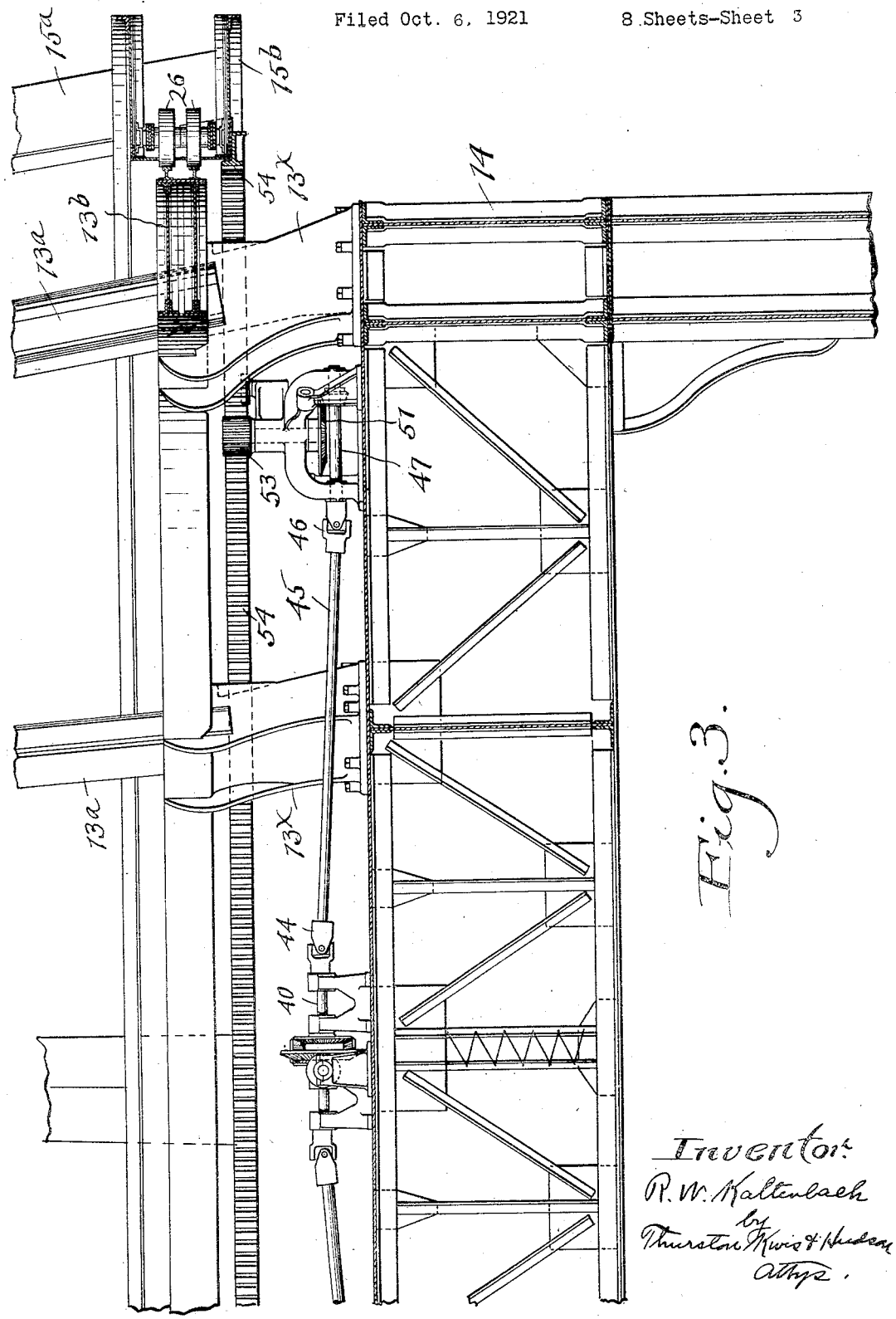
Figure 4:
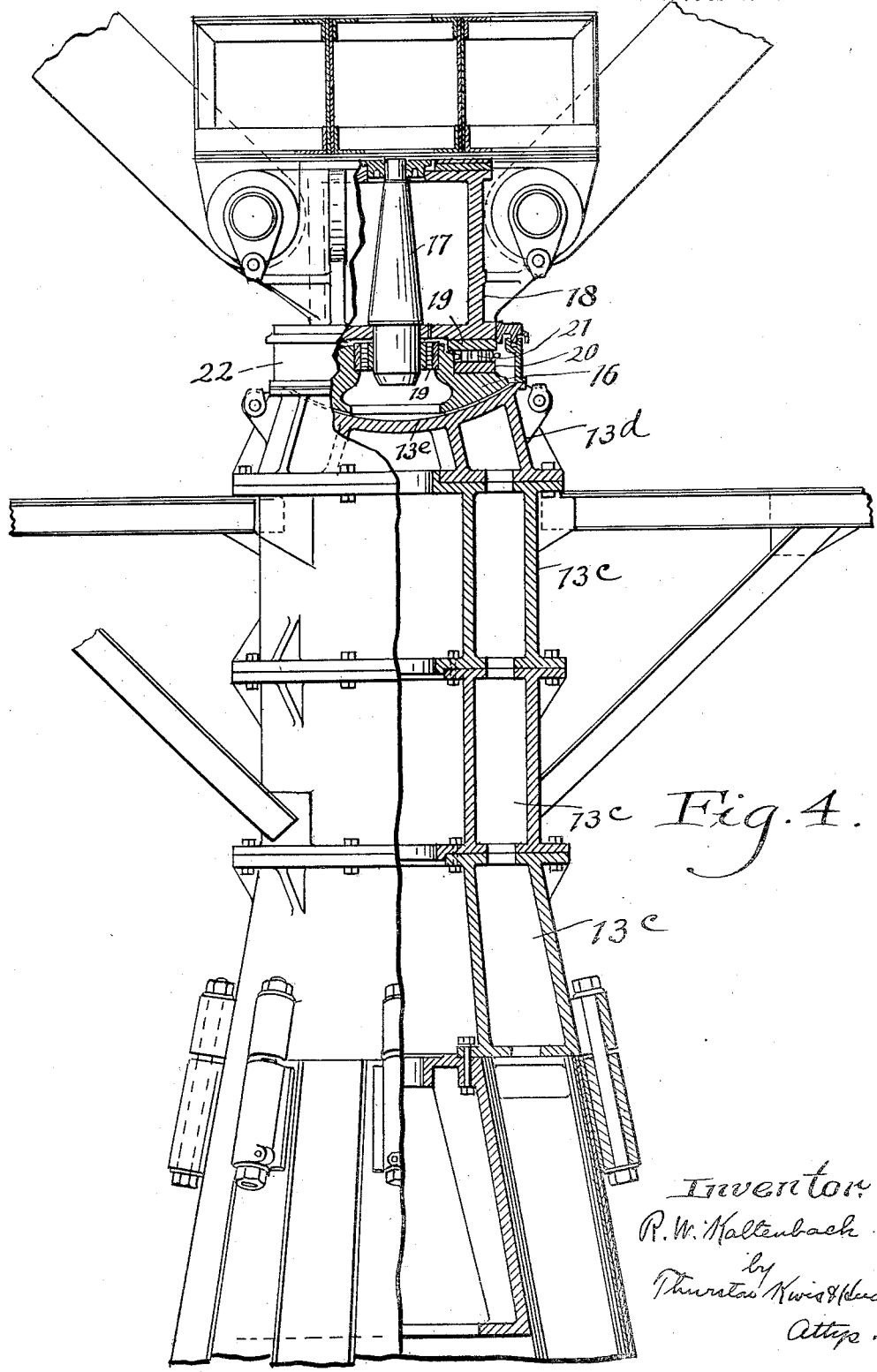
Figure 7:
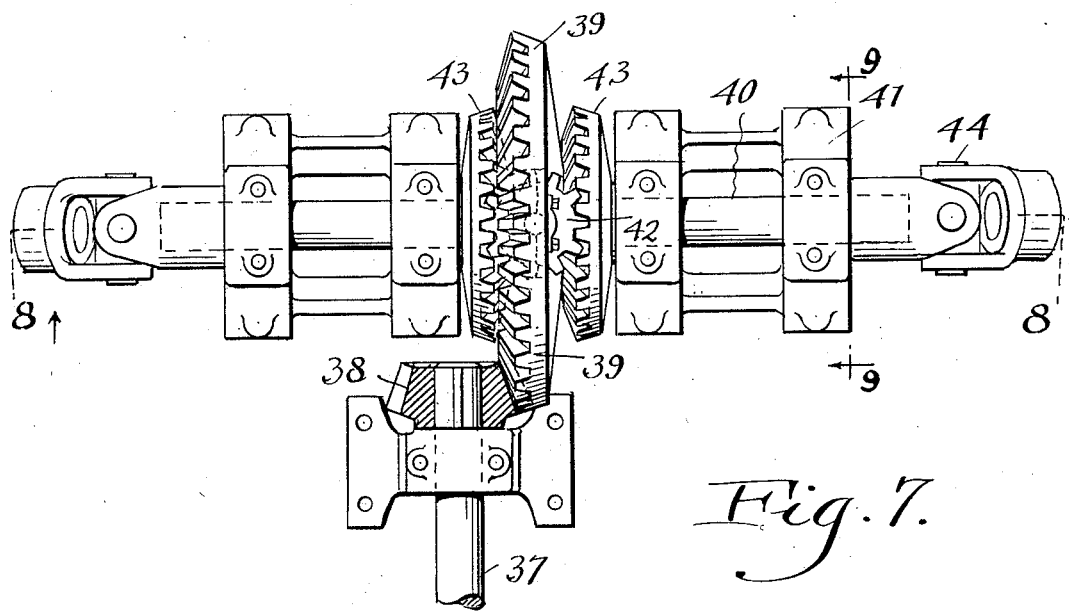
Figure 8:
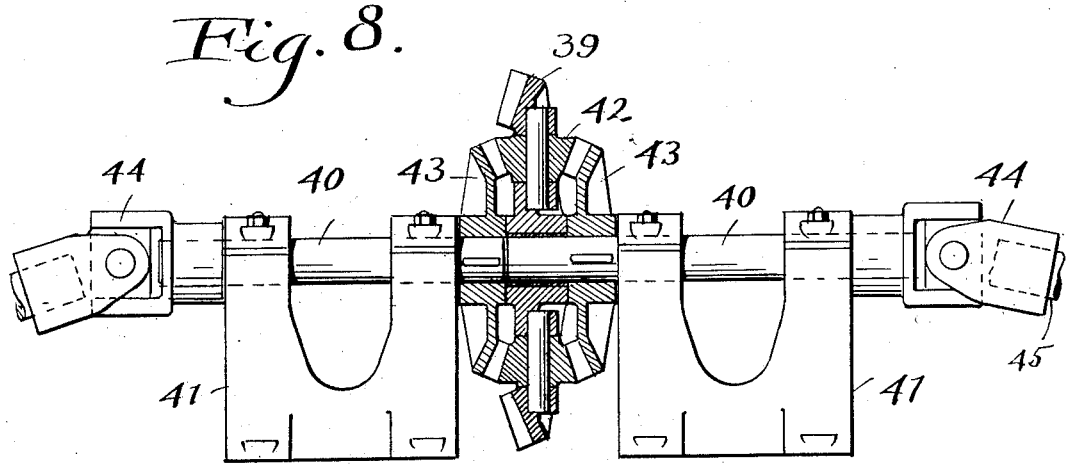
Figure 9:
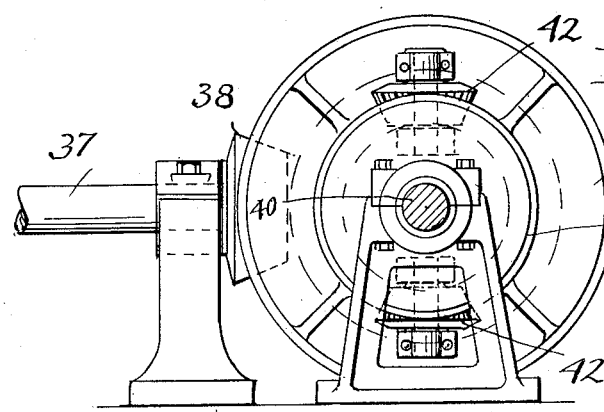

In the accompanying sheets of drawings which show an embodiment of the invention which operates with high efficiency, Fig. 1 is a side view of the frame; Fig. 2 is a horizontal sectional view taken through the lower portion of the tower and skirt, the parts being shown on an enlarged scale; Fig. 3 is a fragmentary vertical sectional view through the lower parts of the skirt and tower and upper part of the portal or base on which the crane is supported; Fig. 4 is a side elevation with parts in section, showing the upper part of the tower, a portion of the rotating structure, and the bearings by which the load is transmitted to the tower; Fig. 5 is a sectional view on an enlarged scale substantially along the line 5—5 of Fig. 2; Fig. 6 is a sectional view substantially along the line 6—6 of Fig. 5; Fig. 6ª is a detached sectional plan view of the drive mechanism of Figs. 5 and 6; Fig. 6ᵇ is a side view of the same looking toward the right of Fig. 5; Fig. 7 is an enlarged detail view with a part in section of a portion of the drive mechansim shown in plan in Fig. 2; Fig. 8 is a vertical sectional view susbtantially along the line 8—8 of Fig. 7, looking in the direction indicated by the arrows; Fig. 9 is a sectional view substantially along the line 9—9 of Fig. 7, looking in the direction indicated by the arrows; Fig. 10 is a plan view on an enlarged scale of another portion of the driving mechanism shown in plan at the center of Fig. 2; Fig. 11 is a sectional view substantally along the line 11—11 of Fig. 10, looking in the direction indicated by the arrows; Fig. 12 is a sectional view substantially along the line 12—12 of Fig. 11, looking in the direction indicated by the arrows; and Fig. 13 is a detail plan view partly in section, showing on a larger scale than in Fig. 2, a portion of the thrust resisting parts carried by the girders at the bottom of the skirt and the bottom of the tower respectively.

Referring to the drawings, 10 represents the load supporting part of the arm or boom of the crane which may be provided with any desired number of hoists 11 and 12. The arm is extended beyond the center of rotation where it is provided with a counterbalancing portion 10ª which preferably overbalances the weight of the main portion 10 of the arm when the latter is provided with no load. The arm or boom is supported on a central stationary tapering tower 13 which is supported on a base or portal 14, and the arm is provided with a long depending skirt 15 which encircles the tower and transmits to the base thereof by a lateral thrust, the unbalanced load of the arm when the latter is with or without load.

The tower 13 is formed principally of structural material including a series of columns 13ª shown in Fig. 1 in elevation, and in Fig. 2 in section. At the base of the tower the columns are connected by a girder 13ᵇ, the exterior of which is circular, this girder being connected to the portal by castings 13ˣ which constitutes seats for the columns as well as a supporting base for the girder. The upper part of the tower is formed by a plurality of castings designated 13ᶜ. The top casting, designated 13ᵈ is provided with a spherical seat 13ᵉ which is engaged by a non-rotating but rockable seat member 16 capable of a slight universal or ball and socket motion on the top casting 13ᵈ. The rotary part of the crane turns about a heavy pivotal pin 17 which is carried by a casting 18 secured to the upper portion of the rotating structure, the axis of this pin (assuming that the portions 10 and 10ª are balanced) coinciding with the axis of the tower 13. Suitable bearing members 17ª connect the lower part of this pin with the casting 16 which include cylindrical anti-friction rollers, and the load of the rotating structure of thrust in a vertical direction is transmitted from the casting 18 to the casting 16 by heavy bearing rings 19 and 20 separated by anti-friction rollers 21. Suitable means will be provided to amply lubricate all the bearings, the outer part of the casting 16 having an upstanding lubricant retaining ring forming an enclosure by which all bearings may be flooded with oil. It will be observed in passing, that the entire weight of the rotating structure, as well as the live load supported by it, is transmitted to the top of the tower, and that the spherical seats of the casting 13ᵈ supported by the tower and casting 16 supported by the rotary structure permit a slight rocking motion of the rotary structure relative to the tower.

The skirt 15 is formed principally of structural material including four columns 15ª which are connected together at the bottom by a circular girder 15ᵇ, the lower ends of the columns 15ª being just outside the girder and being connected thereto by triangular shaped extensions 15ᶜ which project outwardly from the outer surface of the girder at equally spaced points, as shown in Fig. 2. In this figure the columns 15ª are shown in section.

It may be stated at this point that it is an important feature of this invention that the portal 14 is provided with hydraulically operated plungers 23 for elevating the entire rotary structure off its bearings. To do this the superstructure is turned so that the triangular extensions 15ᶜ on the lower circular girder of the skirt are above these plungers, after which the latter are simultaneously elevated. This, as previously stated, allows for an inspection, repairing or replacement of any bearing part.

As already stated, the rocking movement of the rotary structure is resisted by the lower part of the column, this movement causing a lateral thrust to be transmitted from the bottom of the skirt to the bottom of the tower. The means for resisting this thrust forms an important part of the invention, and this will now be explained.

By reference to Figs. 2, 3 and 5 it will be observed that the circular girder 13ᵇ at the bottom of the tower carries at its outer surface two circular thrust rails 25, the heads of which project outwardly. The heads of these rails are engaged by an annular series of rollers 26 which are carried by the annular girder 15ᵇ at the lower end of the skirt 15. These rollers which are arranged in pairs, one above the other, as above shown in Fig. 5, are not fixed in position as thrust rollers ordinarily are when utilized for a purpose such as in the present case, but instead have more or less of a floating action to a limited degree, both radially and circumferentially. The pairs of rollers 26 are in this instance mounted on vertical pins 27 which are connected together by links 28. The rollers and their links constitute in effect a chain or band which encircles the thrust resisting rails of the lower tower girder, but preferably the links and rollers are arranged in two semi-circular series, i. e. in the form of two semi-circular chains, the ends of which at oppositely disposed points of the skirt girder 15ᵇ (see Figs. 2 and 13) are connected to levers 29 pivoted between their ends at 30 to the skirt girder 15ᵇ, the outer ends of the relatively long arms of these levers being connected to threaded bolts 31 of adjustable take-up devices. This adjustment allows the slack to be taken up in the chains due to wear on the roller pins or in the links, and also controls the amount of relative rocking motion between the skirt and tower due to the unbalanced load.

By this thrust resisting mechanism the lateral thrust at the bottom of the skirt is transmitted to the thrust receiving rails at the bottom of the tower by the equivalent of a pair of chains or straps which are carried by the bottom of the skirt and together encircle the rails.

It is to be noted that when the thrust is resisted by the two chains of rollers, the thrust is at all times taken by a plurality of the rollers which is far more efficient and advantageous, than would be the case if the thrust were taken by one roller or a pair of rollers rigidly or fixedly mounted. This feature embodied in what I believe to be the largest crane ever constructed and installed, has proven in practice to be exceedingly efficient.

I will next describe the mechanism for rotating the rotating structure so that the load supporting arm can be swung laterally to any position desired. This is done in this instance by applying rotating power at a plurality of points on the inner periphery of the lower girder 15^b of the skirt, and by the mechanism utilized by me this is accomplished very effectively notwithstanding the fact that the rotating structure is capable of a rocking movement as already described.

For the purpose of rotating the crane I provide on the portal 14 a motor 32 (see Fig. 2) which is connected by reduction gearing to a countershaft 33 having a pinion which drives a gear 34 located at the center of the top surface of the portal. This gear 34 carries two bevel pinions 35, (see Fig. 11) which engage bevel pinions 36 on two shafts 37 extending in opposite directions toward two opposite sides of the portal, one of the shafts having the gear 34 loosely mounted thereon. It will be observed that the gearing just referred to is of the differential type.

Both shafts 37 are provided at their outer ends with bevel pinions 38 (see Figs. 2 and 7) which rotate bevel gears 39 each mounted loosely on one end of one of a pair of aligned shafts 40, 40, which are supported in housings 41 near opposite sides of the portal, these shafts being as shown in Fig 7, at right angles to the driving shafts 37. Each bevel gear 39 carries a pair of oppositely disposed bevel pinions 42 which are located between and engage a pair of bevel gears 43, each keyed to the adjacent ends of the shafts 40. It will be observed that this gearing likewise is of the differential type.

The outer ends of the shafts 40 are connected by universal couplings 44 to shafts 45 which extend four points adjacent the inner surface of the circular girder 15^b of the skirt. The outer ends of the four shafts 45 are connected by universal couplings 46 to shafts 47, each rotatably supported in the arms of a yoke 48, swiveled to turn on oppositely disposed pins in the upstanding arms of a housing 49 (see Fig. 6^a) supported on the portal. By reference to Fig. 5 which shows one of the housings 49 and associated parts just referred to, it will be seen that the housings are located on the portal beneath and just inside of the lower circular girder 15^b of the rotating skirt.

The four shafts 47 are provided each with a bevel pinion 50, and these pinions mesh with and rotate bevel gears 51 secured to the lower ends of upright shafts 52 journaled in vertical bosses 48^a of the yokes 48. At their upper ends the shafts 52 are provided with spur pinions 53 (see Figs. 3, 5 and 6), which engage an internal gear or circular rack 54 secured to the lower inner surface of the circular girder 15^b of the skirt. Thus the rotating structure is rotated through the described mechanism from a single motor 32 through four pinions engaging at equally spaced points the internal gear or circular rack of the lower skirt girder.

In order that driving engagement will at all times be maintained between the pinions 53 and the internal gear 54, the upright boss 48^a of each yoke 48 is provided with an arm 55 projecting outwardly beneath the internal gear, and the outer end of this arm has a vertical pin 56, at the top of which is mounted a roller 57 engaging on the outside of the downturned flange 58 of the gear 54. The rollers 57 keep the pinions 53 in mesh, or in driving engagement with the internal gear 54 of the skirt girder, and inasmuch as the rollers 57 and pinions 53 are a fixed distance apart, and inasmuch as they are supported by a yoke capable of rocking about a horizontal axis at right angles to the roller supporting arms 55, it will be seen that the skirt may rock in any direction without disturbing the drive relationship between the internal gear 54 and the four pinions which rotate it and the rotating structure as a whole.

Various features of the present invention are adaptable for cranes of immense size and adapted to handle extremely heavy loads. In fact, the invention herein illustrated is in use on a crane which will lift a load of three hundred and fifty gross tons on a radius of one hundred and fifteen feet.

While I have illustrated an embodiment of the invention which operates with very high efficiency in a crane of the size and adapted to lift a load such as just stated, I do not desire to be confined to the precise details or arrangements shown, but aim in my claims to cover all modifications which do not involve a departure from the spirit and scope of the invention as defined in the appended claims.

Having described my invention, I claim:

1. A crane comprising a load supporting boom or arm provided with a depending skirt, a tower extending upwardly through the skirt, and at its upper end rotatably supporting the arm and skirt, the arm and skirt being also mounted for rocking movement about the axis of the tower.

2. A crane structure comprising a stationary tower, a rotating load supporting structure supported at the top of the tower for rotary and rocking movement about the axis of the tower and comprising a load supporting arm or boom, and a skirt which surrounds the tower and extends downwardly substantially to the bottom thereof, and means operatively connected to the skirt for rotating the skirt and arm.

3. A crane comprising a stationary tower, a load supporting structure supported at the upper part of the tower for rotary movement and for a rocking movement, said structure comprising a laterally projecting arm and a depending skirt, the latter surrounding and extending downwardly along the tower, and means for applying rotating power to the skirt to rotate the rotary structure.

4. A crane comprising a stationary tower, a load supporting structure supported by the upper part of the tower and comprising a laterally projecting arm or boom and a depending skirt, the latter surrounding and extending downwardly over the tower, said skirt and tower being provided adjacent the bottom with circular bearing members, one of said members being in the form of an expansible and contractable band carrying thrust transmitting rollers engaging the other member.

5. A crane comprising a stationary tower, a load supporting structure supported by the upper part of the tower and comprising a laterally projecting arm or boom and a depending skirt, the latter surrounding and extending downwardly over the tower, said skirt being provided at the bottom with a circular rack or gear, and means comprising a plurality of pinions engaging the gear at equally spaced points for rotating the rotary structure.

6. A crane comprising a stationary tower, a rotary part supported at the upper portion thereof and comprising a laterally projecting boom or arm and a depending skirt, the latter extending downwardly substantially to the base of the tower, a gear or circular rack at the bottom of the skirt, and means for rotating the rotary part comprising a motor on the base of the tower, a plurality of movably mounted pinions engaging the gear or rack and operatively connected to said motor, and means for holding said pinions in engagement with the gear.

7. A crane structure comprising a stationary tower and a load supporting part supported by the tower for rotary movement about the axis of the same and for rocking movement, and comprising a laterally projecting arm or boom and a depending skirt extending downwardly along the tower, the lower part of the skirt having a circular rack or gear extending about the tower, a pinion for rotating the arm and skirt engaging said gear or circular rack, and means for causing the pinion and circular rack to move together during the rocking movement.

8. A crane structure comprising a stationary tower and a load supporting part supported by the tower for rotary movement and for rocking movement, and comprising a laterally projecting arm or boom, and a depending skirt extending downwardly along the tower, the lower part of the skirt having a circular rack or gear extending about the tower, a plurality of pinions supported at the base of the tower and engaging said rack or gear to rotate the same, and means for holding the pinions in proper engagement with the rack or gear when the skirt and arm are rocked on the tower.

9. A crane comprising a stationary tower, a rotary load supporting part supported at the upper part of the tower comprising a laterally projecting boom or arm and a depending skirt, the latter surrounding and extending downwardly substantially to the base of the tower, the lower part of the tower and the lower part of the skirt having thrust resisting means including a plurality of adjustably mounted rollers carried by one part and adapted to engage the other part.

10. A crane comprising a stationary tower, a rotary load supporting part supported at the upper part of the tower comprising a laterally projecting boom or arm and a depending skirt, the latter surrounding and extending downwardly substantially to the base of the tower, the lower part of the skirt having a plurality of adjustably mounted rollers and the lower part of the tower having an annular member which the rollers engage.

11. A crane comprising a stationary tower, a rotary load supporting part supported at the upper part of the tower comprising a laterally projecting boom or arm and a depending skirt, the latter surrounding and extending downwardly substantially to the base of the tower, the lower part of the tower having a thrust resisting rail and the lower part of the skirt having a plurality of thrust transmitting rollers flexibly connected together in the form of a chain.

12. A crane comprising a stationary tower, a rotary load supporting part supported at the upper part of the tower comprising a laterally projecting boom or arm and a depending skirt, the latter surrounding and extending downwardly substantially to the base of the tower, the lower part of the tower having a thrust resisting rail and the lower part of the skirt having a plurality of thrust transmitting rollers flexibly connected together in series in the form of a chain.

13. A crane comprising a stationary tower, a rotary load supporting part supported at the upper part of the tower comprising a laterally projecting boom or arm and a depending skirt, the latter surrounding and extending downwardly substantially to the base of the tower, the lower part of the tower having a thrust resisting rail and the lower part of the skirt having two sets of thrust resisting rollers, each set extending part way about the skirt and connected together in the form of a chain which is held at its ends on the skirt.

14. A crane comprising a stationary tower, a rotary load supporting part supported at the upper part of the tower comprising a laterally projecting boom or arm and a depending skirt, the latter surrounding and extending downwardly substantially to the base of the tower, the lower part of the tower having an annular girder with a thrust resisting rail and the lower part of the skirt having an annular girder carrying a plurality of thrust transmitting rollers flexibly connected together like a chain and engaging the rail.

15. A crane comprising a stationary tower, a rotary load supporting part supported at the upper part of the tower comprising a laterally projecting boom or arm and a depending skirt surrounding and extending downwardly substantially to the base of the tower, the lower part of the tower having an annular girder with a thrust resisting rail and the lower part of the skirt having an annular girder carrying an internal gear or circular rack, and carrying also a plurality of thrust transmitting rollers flexibly connected together in the form of a chain whose ends are anchored on the skirt, and means engaging said internal gear or circular rack to rotate the skirt and arm.

16. A crane comprising a stationary tower, a rotary load supporting part supported on the tower and comprising a laterally projecting boom or arm and a depending skirt surrounding and extending downwardly substantially to the base of the tower, the lower part of the skirt having a series of movable thrust resisting rollers linked together and encircling the lower part of the tower, and means for adjusting the series of linked rollers to compensate for wear and to control the degree of relative movement between the skirt and tower.

17. In a crane, a portal, a tower supported on the portal, a rotary structure supported on bearings of the tower and comprising a laterally projecting arm or boom and a depending skirt surrounding and extending downwardly substantially to the base of the tower, said portal having a plurality of lifting devices for lifting the rotary structure off its bearings.

18. In a crane, a portal or base having an upwardly projecting tower, a rotary structure supported on bearings adjacent the top of the tower and comprising a laterally projecting arm or boom and a depending skirt extending downwardly substantially to the base of the tower, said portal having at its corners vertically movable lifting devices, and the skirt having at the bottom an annular girder with extensions forming abutments adapted to be positioned over said lifting devices whereby the entire rotary structure may be lifted off its bearings.

In testimony whereof, I hereunto affix my signature.

ROBERT W. KALTENBACH.